United States Patent [19]

Shannon

[11] 4,310,585
[45] Jan. 12, 1982

[54] FIBROUS PRODUCT FORMED OF LAYERS OF COMPRESSED FIBERS

[75] Inventor: Richard F. Shannon, Lancaster, Ohio

[73] Assignee: Owens-Corning Fiberglas Corporation, Toledo, Ohio

[21] Appl. No.: 48,926

[22] Filed: Jun. 15, 1979

[51] Int. Cl.³ .............................................. B32B 15/00
[52] U.S. Cl. .................................... 428/218; 138/145; 138/149; 428/219; 428/280; 428/284; 428/285; 428/286; 428/426; 428/920
[58] Field of Search ............... 428/280, 282, 284, 285, 428/286, 288, 289, 290, 298, 302, 426, 375, 376, 377, 383, 394, 273, 299, 218, 219, 920; 156/62.4, 167; 264/109, 122, 118, 128; 65/3 C, 4 R; 138/145, 149; 432/233, 234

[56] References Cited

U.S. PATENT DOCUMENTS

| | | | |
|---|---|---|---|
| 2,931,738 | 4/1960 | Stalego | 428/375 |
| 2,941,899 | 6/1960 | Stalego | 428/427 |
| 3,002,857 | 10/1961 | Stalego | 428/378 |
| 3,549,473 | 12/1970 | Le Blanc et al. | 428/273 |

Primary Examiner—James J. Bell
Attorney, Agent, or Firm—Ronald C. Hudgens; Greg Dziegielewski; Harry O. Einsberger

[57] ABSTRACT

The disclosure embraces a method of spraying a binder composition of hybrid character containing both organic and inorganic materials into a fiber-forming hood or chamber onto glass fibers produced by a fiber-forming process, the disclosure embracing fibrous insulation products, such as pipe insulation and block insulation, the products embodying hybrid binder composition wherein the organic phase of the binder composition improves moldability and handleability of the fibrous product during processing and installation and which provides hardness and toughness characteristics in the products to resist or prevent handling damage and physical damage in use, the inorganic phase of the binder system providing high bond strength and improved thermal stability in the product particularly under high temperatures which may volatilize the organic binder, the inorganic phase of the binder system preventing or resisting fiber slump under high temperature conditions.

18 Claims, 14 Drawing Figures

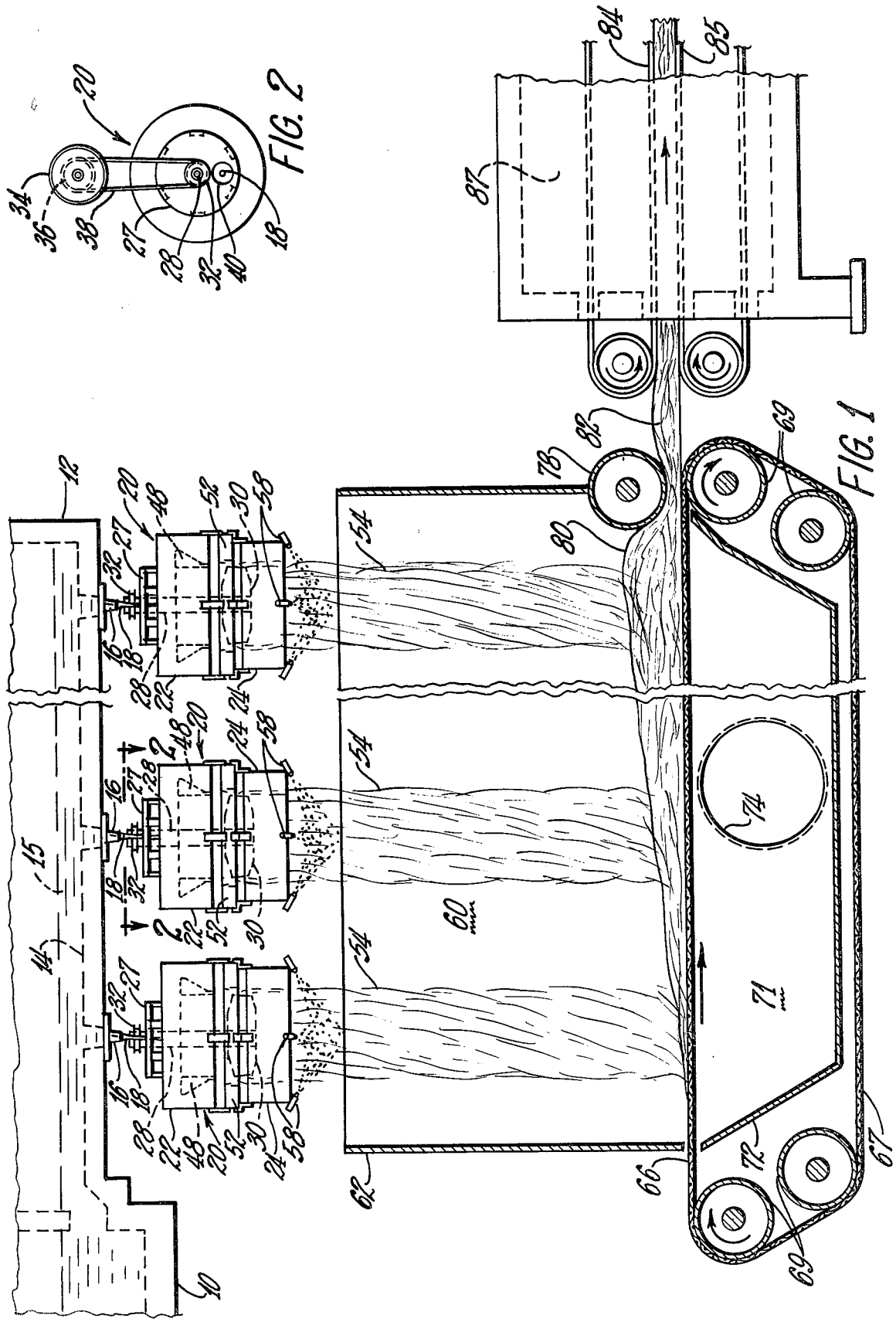

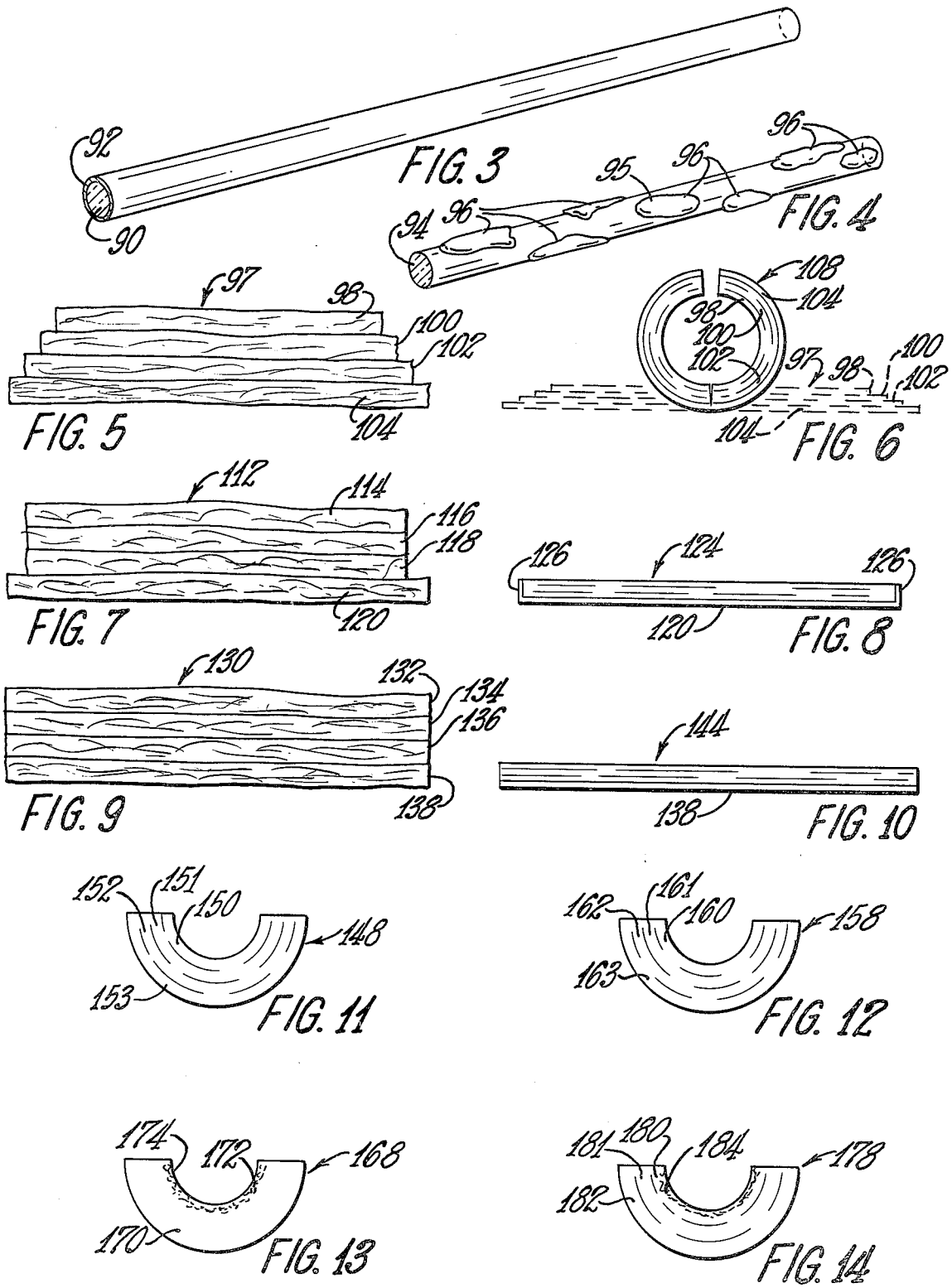

FIBROUS PRODUCT FORMED OF LAYERS OF COMPRESSED FIBERS

The invention relates to a method of spraying a hybrid binder composition comprising organic and inorganic bonding materials onto attenuated fibers moving through a fiber-forming hood or chamber from a fiber attenuating facility and to the processing of the binder impregnated fibers into fibrous products and more especially fibrous pipe insulation or block insulation wherein the inorganic phase of the binder system provides high bond strength and improved thermal stability and wherein the fibrous product may be provided with an outer shell or surface layer of fibers containing resinous or organic binder for improving the moldability and handleability of the product during processing and which provides hardness and toughness characteristics in the product to resist or prevent handling damage or physical damage in use.

Many endeavors have heretofore been made to improve the bonding characteristics of the binder in fibrous products such as fibrous pipe insulation and block insulation but all such products heretofore made have not been entirely satisfactory for various reasons. Pipe insulation and block insulation have been made embodying glass fibers, fibers from fusible rock, or fibers from slag and insulating products of this character have been bonded together with an organic or resin binder which does not withstand temperatures in excess of about 450° F. and 500° F. When such products are exposed to higher temperatures, the organic binder burns off or volatilizes resulting in a soft, substantially unbonded fiber pack that is highly susceptible to handling and compression damage as well as damage to the surface of the product.

Such products have not been entirely satisfactory because they are not endowed with a hardness effective to resist damage such as may be caused by persons walking on pipes insulated with such material or damage that may result from placing ladders against insulated pipes or walls of such insulating material.

The present invention has for an object the provision of a method for spraying or delivering a binder composition or binder system onto glass fibers in a fiber-forming hood or chamber of a fiber-forming instrumentality wherein the binder composition comprises a mixture of organic and inorganic bonding materials to effect a substantially uniform distribution of the binder composition in the mass or pelt of fibers collected from the forming hood.

An object of the invention involves processing layers or pelts of fibers, such as glass fibers, fibers formed of fusible rock, slag or ceramic material impregnated with hybrid binder and the assemblage of layers or pelts of binder-impregnated fibers molded or configured to a desired shape such as for pipe insulation or block insulation.

Another object of the invention is the provision of a fibrous product comprising a plurality of layers or pelts of fibers of inorganic material wherein one or more layers or pelts are impregnated with inorganic binder and one or more other layers or pelts impregnated with resin or organic binder.

Another object of the invention is the provision of a fibrous product wherein one or more layers or pelts of fibers are impregnated with hybrid binder and one or more outer layers impregnated with resin or organic binder providing a protective outer shell having hardness and toughness characteristics to resist handling damage and physical damage in use.

Another object of the invention is the provision of a fibrous product fashioned of layers of fibers impregnated with an organic or resin binder, such as pipe wrap insulation, and wherein the region of the insulation engaging the pipe is partially impregnated with hybrid binder to resist high temperatures of the pipe providing a product which has a high bond strength and improved thermal stability particularly when the product is subjected to high temperatures which may volatilize the organic binder, the inorganic phase of the binder system preventing or resisting fiber slump under high temperature conditions.

Another object of the invention is the provision of fibrous pipe wrap insulation wherein one or more layers of fibers of glass, fusible rock, slag or ceramic fibers are impregnated with an organic binder, and a region of the insulation contacting the pipe being partially impregnated with hybrid binder to render the product of higher bond strength and high thermal stability under high temperature conditions.

Another object of the invention is the provision of a fibrous product comprising layers of glass fibers, fibers of fusible rock, slag fibers or ceramic fibers impregnated with hybrid binder or organic and inorganic bonding materials molded or processed into desired configuration, the product having an outer shell or layer of glass fibers impregnated with resin or organic bonding material whereby the fibers impregnated with the hybrid binder impart high bond strength and thermal stability to the product, the outer layer or layers of glass fibers providing hardness and toughness characteristics in the product to resist handling damage and physical damage when in use.

Another object of the invention resides in the provision of a fibrous product such as pipe wrap insulation or block insulation wherein a fibrous core may be impregnated with an inorganic binder or a hybrid binder of organic and inorganic constituents and wherein a surface layer or sheath is provided on the core, the surfacing layer or sheath comprising glass fibers bearing an organic binder for the purpose of providing a high strength surface or shell which is highly resistant to handling damage and physical damage as well as improving the appearance of the product, the product being highly resistant to warping, crazing, cracking or fissuring.

Another object of the invention resides in applying hybrid binder constituents onto fibers including first applying organic or resin binder constituents onto the fibers and molding the fibers into a product and thereafter applying inorganic binder constituents to saturate the resin-bonded fibers with inorganic binder, or applying inorganic binder onto the fibers bearing the organic binder before processing the hybrid binder impregnated fibers into a product.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 1 illustrates an arrangement and method for forming glass fibers and spraying a hybrid or organic-inorganic binder system or composition onto the fibers;

FIG. 2 is a plan view of one of the fiber-forming units, the view being taken substantially on the line 2—2 of FIG. 1;

FIG. 3 is an isometric view of a greatly enlarged fiber or filament coated with an organic-inorganic binder composition;

FIG. 4 is an isometric view of a greatly enlarged fiber or filament bearing an organic or resin binder;

FIG. 5 illustrates an assemblage of several layers of fibers bearing an inorganic binder or a hybrid binder and an outer layer of resin binder-bearing fibers;

FIG. 6 illustrates an end view of a fibrous product such as pipe wrap fashioned from the assemblage of layers of fibers of FIG. 5;

FIG. 7 illustrates another assemblage of several layers of fibers bearing an inorganic binder or a hybrid binder and an outer layer of resin binder-bearing fibers;

FIG. 8 illustrates a block-like fibrous product fashioned by compressing the layers of fibers shown in FIG. 7 with the outer layer embracing the ends of the other compressed layers of fibers and setting the binder in the compressed fibers;

FIG. 9 illustrates another assemblage of several layers of fibers bearing a hybrid binder and an outer layer of resin binder-bearing fibers;

FIG. 10 illustrates a block-like fibrous product fashioned by compressing the layers of binder-bearing fibers, shown in FIG. 9, and setting the binder in the compressed fibers;

FIG. 11 is an end view illustrating one half of a pipe wrap insulation section wherein the innermost layer of fibers is impregnated with inorganic binder or hybrid binder and the remaining layers being glass fibers bearing organic or resin binder;

FIG. 12 is an end view illustrating one half of a pipe wrap insulation section in which one or more inner layers are fibers impregnated with inorganic binder or hybrid binder with an outer layer or layers or pelts of glass fibers containing resin or organic binder;

FIG. 13 is an end view illustrating one half of a pipe wrap insulation section of one or more layers of glass fibers impregnated with resin or organic binder, the inner region of the pipe wrap being partially impregnated with inorganic or hybrid binder, and FIG. 14 is an end view illustrating one half of a pipe wrap insulation section wherein inner layers of fibers are of fusible rock, slag or ceramic bonded with organic binder, and an outer layer of glass fibers impregnated with resin or organic binder with the innermost region of the pipe wrap section being partially impregnated with organic-inorganic hybrid binder.

While the fibers utilized in the products of the invention are preferably amorphous glass fibers which may be formed through the use of apparatus and according to the method illustrated in FIG. 1, or other known methods, it is to be understood that other fibers may be utilized, such as crystallizable glass fibers or fibers formed from fusible rock, slag or mixtures of fibers of fusible rock and slag or fibers of ceramic materials, such as aluminum silicate formed by well known conventional methods.

Referring to the drawings in detail and initially to FIG. 1, there is illustrated an arrangement or apparatus for forming attenuated fibers from heat-softened glass which may be amorphous glass or crystallizable glass and for spraying or delivering a hybrid binder, that is, a binder composition of organic and inorganic constituents or materials onto the fibers in the forming hood or chamber and collecting the binder-bearing fibers. The arrangement or apparatus includes a melting and refining furnace 10 in which glass batch is conditioned by the application of heat in a conventional manner to a heat-softened or flowable state, the flowable glass being refined in the furnace.

Connected with the furnace 10 is a forehearth 12 having a channel 14 in which heat-softened glass 15 flows from the furnace. Arranged along the floor of the forehearth in lengthwise spaced relation are stream feeders 16, each feeder flowing a stream 18 of glass from the forehearth channel 14. A fiber-forming unit or instrumentality 20 is disposed beneath each stream feeder, each unit 20 adapted to receive a glass stream 18. The fiber-forming arrangements illustrated in FIG. 1 are of the general character of that disclosed in Kleist et al U.S. Pat. No. 3,759,680.

FIG. 2 illustrates a top plan view of one of the units 20. While three fiber-forming units are illustrated in FIG. 1, it is to be understood that a greater or lesser number of units may be employed depending upon the desired production of glass fibers.

The fiber-forming units 20 include support members 22 which are mounted by conventional structural frame means (not shown). The fiber attenuating region of each fiber-forming unit is surrounded by a thin walled cylindrically-shaped metal guard 24. Journally mounted in bearings carried by frame member 27 is a shaft 28, a hollow spinner or rotor 30 being secured to the lower end of each shaft 28. The upper end of each of the shafts 28 is equipped with a sheave or pulley 32.

As shown in FIG. 2, each unit is provided with an electrically energizable motor 34, the shaft of each motor being provided with a sheave or pulley 36. A drive is established for each spinner or rotor 30 by a belt 38 connecting the sheaves 32 and 36. Each frame member 27 is fashioned with an opening 40 through which a stream 18 of molten glass flows into a spinner or rotor 30.

The peripheral wall of each spinner 30 is provided with a large number of small orifices or passages (not shown), there usually being ten thousand or more orifices through which the heat-softened glass in the interior of each spinner is projected outwardly by centrifugal forces as small streams or linear bodies.

Each of the support members 22 is fashioned with a refractory-lined annular combustion chamber 48, each chamber having an annular discharge outlet or throat adjacent and above the peripheral wall of each spinner 30. A fuel and air mixture is admitted into each chamber 48 and combustion occurs therein, the products of combustion being extruded through each annular outlet or throat as a high temperature gas stream providing a heated environment at the peripheral wall of each rotor for the centrifuged bodies or streams of glass.

Surrounding each spinner is an annular blower construction 52 having an annular outlet or delivery orifice adjacent to and spaced from the peripheral wall of the spinner 30. Steam, compressed air or other gas under pressure is supplied to each blower 52 and the blast from the blower engages the linear bodies or streams of glass centrifuged from the orifices or openings in the wall of the spinner, the force of the blast attenuating the bodies or streams of glass into fibers 54 of varying lengths.

Supported by each of the guard members 24 or by other suitable means are applicator nozzles 58 for spraying or delivering hybrid binder, that is, a binder composed of organic and inorganic constituents or materials onto the fibers 54.

The fibers 54 are delivered from the units 20 into a rectangularly-shaped chamber or forming hood 60 defined by a walled enclosure 62. The enclosure 62 is open at the bottom, and arranged at the base of the chamber 60 is the upper flight 66 of a movable fiber collector or foraminous conveyor 67. The conveyor 67 is supported and guided by pairs of rolls 69, one of the rolls being driven by conventional motive means to advance the upper flight 66 in a right-hand direction.

Positioned beneath the upper conveyor flight 66 and in registration with the fiber-forming chamber 60 is a suction chamber 71 defined by a thin walled receptacle 72. The suction chamber 71 is connected by a pipe 74 with a suction blower of conventional construction (not shown) for establishing subatmospheric or reduced pressure in chamber 71. The reduced pressure in chamber 71 assists in the collection of the fibers 54 upon the conveyor flight 66, the spent gases of the attenuating blasts from the blowers 52 being conveyed away through the pipe 74.

A sizing roll 78 or other fiber compressing means is disposed at the exit end of the chamber 60 and is adapted to be rotated by suitable means (not shown). The mass 80 of collected fibers is compressed into a layer, mat or body 82 to an extent depending upon the density desired for the fibrous layer or body and the end use therefor.

If the binder-impregnated fibrous layer or body 82 is to be fashioned into an unmolded product, the binder-impregnated layer may be advanced by endless belts 84 and 85 through a curing chamber or oven 87 in which the hybrid binder is set or cured by the application of circulating air or heat in a well known conventional manner. The cured fibrous body or mat may be cut or severed into bodies of desired sizes.

If fibrous layers or bodies 82 impregnated with the hybrid binder are to be processed in forming products such as those of the character illustrated in FIGS. 6, 8 and 10 through 14 of the drawings, the layers or bodies 82 containing hybrid binder are not subjected to the binder curing or setting environment provided by the chamber 87. The uncured layers or bodies 82 may be utilized to provide layers of fibers, such as shown in FIGS. 5 through 14, for further processing or molding to form end products. The uncured fibrous layers or bodies may be stored for future processing into fibrous products.

The hybrid binder which embraces organic and inorganic constituents or materials may be formed of various constituents or materials or mixtures thereof for both the inorganic phase and the organic phase of the binder system. By way of example the materials or constituents that may be employed for providing the organic phase of the hybrid binder system may be thermoplastic resins but thermosetting resins are preferred, such as phenol formaldehyde, urea formaldehyde, melamine formaldehyde, or blends of copolymers of these resins. Borated, dicyandiamide, and urea modified versions of the above resins and copolymers thereof may be used.

In addition to a thermosetting resin, the organic phase of the hybrid binder may contain minor quantities of conventional humectants, film formers, coupling agents, hydrophobing agents, thickening agents and mold release agents.

A major characteristic desired for the inorganic binder or the inorganic phase of a hybrid binder system is the capacity to bond to itself and to glass fibers or other fibers and to retain this bond strength at temperatures of 1000° F. or more. The inorganic binder materials or the inorganic phase of the hybrid binder system must be compatible with the organic materials in the binder system. Inorganic binders which meet the above criteria include colloidal silicas, colloidal aluminas, bentonite clays, ball clays, and blends of boric acid and kaolin clay.

Inorganic materials or constituents which have been found to be very satisfactory are colloidal silica known commercially as Ludox H.S., a colloidal silica produced and marketed by E. I. du Pont de Nemours & Co., and Ludox A.M., an aluminum modified colloidal silica produced and marketed by E. I. du Pont de Nemours & Co. While the inorganic binder is capable of bonding to the surfaces of the fibers, it has been found desirable to include in the inorganic phase of the binder system a material capable of reacting with the surfaces of the fibers to form a higher melting sheath around the fiber core resulting in a fiber that can be subjected to very high temperatures without encountering fiber slump.

Materials which may be added to react with the surfaces of the fibers to attain a higher melting sheath include silica, $TiO_2$, $Zr_2O_3$ or MgO. Such added material enhances the stability of the product. The materials or constituents of the inorganic phase of the hybrid binder system provide high bond strength in the product even though the organic binder in the system has disappeared or been driven off under the influence of high temperatures to which the product may be subjected.

In addition to the reactive materials or constituents in the inorganic binder or the hybrid binder, fillers may be added such as silica flour, hydrated alumina or earth fillers such as silicates, oxides, hydrates and carbonates or the like.

The functions among others of the organic phase of the hybrid binder are to improve the moldability and handleability of the product during processing, shipping and installation. The fibrous products containing the hybrid binder system may be in the form of pipe wrap insulation which may be installed on piping having temperatures well above those which the organic resin binder will withstand, the inorganic phase in the binder system providing high strength in the product especially in the event of heat deterioration or volatilization of the organic or resin phase of the binder system.

The density of the fibrous product may be in a range of six to twenty-five pounds per cubic foot and preferably in a density range of eleven to fifteen pounds per cubic foot.

In the production of certain fibrous products containing inorganic binder or hybrid binder, such as molded pipe wrap insulation and block insulation, it is desirable to mold an outer layer or layers of organic binder-bearing fibers to attain hardness and toughness to minimize handling damage and prevent physical damage to the pipe wrap or block insulation that may otherwise result by persons walking on the pipe wrap or by ladders leaning against the pipe wrap or block insulation.

In reference to FIG. 3 there is illustrated a fiber or filament 90 which may be of amorphous glass, crystallizable glass, rock fiber, slag fiber or ceramic fiber provided with a coating 92 of hybrid binder comprising organic and inorganic constituents or materials. While the hybrid binder tends to flow over the surfaces of the fibers or filaments, it does not usually completely coat the fibers as illustrated in FIG. 3 particularly when the hybrid binder is sprayed on the fibers. The hybrid binder coats the fibers more completely than the widely spaced globules of binder illustrated in FIG. 4. However, by applying the hybrid binder through the use of a conventional dip-suction method, a coating is attained which substantially covers the fiber surfaces.

The flowability of the hybrid binder may be improved by the addition of materials that increase wet out of the fiber surfaces and thereby approach a more complete coating of the fibers. Where the hybrid binder covers most of the surfaces of the fibers, there is provided more effective bonding of the fibers at their intersections, a factor which promotes improved strength and stability of the product. Another important advantage is that the hybrid binder covering the fiber surfaces provides better protection against fiber slump under high temperature conditions.

FIG. 4 is illustrative of a fiber or filament 94 bearing an organic binder 95, such as a thermosetting resin binder. There is a tendency for the organic or resin binder to form in irregularly-shaped globules as illustrated at 96 in FIG. 4.

FIG. 5 illustrates an assemblage or orientation 97 of layers, pelts, laminations or bodies of fibers bearing uncured binder suitable for forming or molding into pipe wrap or insulation product shown in FIG. 6 or similar products. The assemblage of FIG. 5 is inclusive of fibrous layers or laminations 98, 100, 102 and 104. The layers or laminations 98, 100 and 102 are preferably of glass fibers but may be rock fibers, slag fibers, ceramic fibers or mixtures thereof, the fibers of these layers being impregnated with an inorganic binder or the hybrid binder system, that is, a binder comprising organic and inorganic constituents or materials.

It is preferable that the outer layer 104 of glass fibers be impregnated only with an organic binder, such as phenol formaldehyde, urea formaldehyde, melamine formaldehyde or the like, the binder being uncured in the several fibrous layers. The layers of fibers in the assemblage 97 are of progressively different widths as shown in FIG. 5 and are adapted to be compressed and processed by molding or similar process into cylindrically-shaped pipe wrap 108 illustrated in FIG. 6.

In the molding or processing operation, the layers of fibers 98, 100, 102 and 104 are compressed to a desired density and formed or molded into the cylindrical configuration of pipe wrap insulation 108 as in FIG. 6 and the binder set or cured in the fibers. In the pipe wrap insulation 108, the three inner layers of fibers are impregnated with inorganic binder or hybrid binder and the outer layer 104 impregnated with a thermosetting resin or organic binder.

It is to be understood that the outer layer 104 may be a layer of glass fibers impregnated with the hybrid binder system but it is found preferable that the outer layer 104 be bonded with an organic binder or thermosetting resin to provide a tough outer shell or surface layer for the pipe wrap insulation which is highly resistant to physical damage.

The pipe wrap insulation 108 with inner layers of fibers bearing inorganic binder is resistant to high temperatures. The pipe wrap insulation provided with a hybrid binder system in the inner layers of fibers is highly resistant to temperatures of 1200° F. or more but at such high temperatures the organic or resin phase of the binder system deteriorates or is volatilized but the inorganic phase of the binder system remains effective to provide both strength and stability to the pipe wrap so that it performs its insulating function even though the organic phase of the binder system has deteriorated or been volatilized by the high temperatures.

While FIG. 5 illustrates three layers of fibers bearing an inorganic binder or a hybrid binder and an outer layer bearing organic binder, it is to be understood that a lesser or greater number of layers of fibers bearing inorganic binder or hybrid binder may be employed and more than one outer layer of fibers bearing organic binder may be utilized in forming the pipe wrap illustrated in FIG. 6.

FIG. 7 illustrates an assemblage 112 of layers, laminations, pelts or bodies of fibers bearing uncured binders for fashioning a block-like insulation product. The assemblage of FIG. 7 is inclusive of layers or laminations 114, 116, 118 and 120 of fibers. The outer layer 120 of fibers has extended end portions to embrace the ends of the remaining layers of fibers in forming the block insulation product 124 shown in FIG. 8. The laminations or layers 114, 116 and 118 are preferably of glass fibers but may be rock fibers, slag fibers or ceramic fibers and are impregnated with or bear an inorganic binder or a hybrid organic-inorganic binder system.

The layer 120 is preferably of glass fibers and is impregnated with an organic or thermosetting resin binder to provide a tough surface layer or shell for the product 124. In forming the product 124, shown in FIG. 8, the several layers of fibers bearing uncured binder constituting the assemblage 112 are compressed to a desired density and in the molding operation the end portions 126 of the layer 120 embrace ends of the other layers.

The compressed assemblage of binder-bearing layers of fibers is subjected to an environment to set or cure the binder in the several layers forming the block or block-like insulation product 124. It is to be understood that all of the layers of fibers in the assemblage and product shown in FIGS. 7 and 8 may be impregnated with the hybrid binder system of organic and inorganic constituents or materials if desired. The density of the product 124, shown in FIG. 8, may be in a range of six to twenty-five pounds per cubic foot depending upon the end use for the block insulation or product 124.

FIG. 9 illustrates an assemblage 130 of layers, laminations, pelts or bodies of fibers for forming a body of insulation or block-like product illustrated at 144 in FIG. 10. The fibrous layers or laminations 132, 134, 136 and 138 comprising the assemblage 130 are preferably of glass fibers impregnated with the hybrid binder system, that is, a binder of organic and inorganic constituents or materials.

The assemblage 130 may be compressed or molded into the product 144, shown in FIG. 10, and the binder set or cured in the assemblage. If desired, the outer fibrous layer 138 may be impregnated only with a thermosetting or organic binder to provide a surface layer for the product 144 which is highly resistant to physical damage. The layers of fibers or assemblages of layers of fibers bearing the hybrid binder system and/or a fibrous layer bearing an organic binder in an uncured or unset state may be maintained in such condition for extended periods of time before further processing, molding and setting or curing the binder system to form the products herein described.

FIG. 11 illustrates a molded half section 148 of pipe wrap insulation. In this form there is illustrated a pipe wrap insulation comprising four layers, laminations, pelts or bodies of fibers designated 150, 151, 152 and 153. The fibers of the layers may be glass fibers, fusible rock fibers, slag fibers or ceramic fibers. However, it is preferred that the outermost layer 153 be formed of glass fibers.

The innermost layer 150 is impregnated with or contains an inorganic binder or a hybrid binder of organic-inorganic materials as this layer, in assembly with a pipe, is in contiguous engagement with the pipe. The inorganic or hybrid binder in the inner layer 150 is highly resistant to high temperatures which may occur by reason of high temperature fluids flowing through the pipe.

The adjacent layers 151, 152 and 153 of fibers are impregnated with or contain organic or resinous binders. It is to be understood that in this form there may be more or less layers of fibers but the inner layer is impregnated with or contains the high temperature resistant hybrid binder. The layers of binder-impregnated fibers before the molding step may be assembled in stacked relation in the manner illustrated in FIG. 5.

It is to be undestood that the full pipe wrap insulation, of which 148 is illustrative of a half section, is of circular configuration of the character illustrated in FIG. 6. In the molding operation the fibers are compressed and the binder in the layers 150 through 153 of fibers is set or cured in the operation of molding the layers of fibers into pipe wrap configuration.

FIG. 12 is a view similar to FIG. 11 illustrating a molded half section 158 of pipe wrap insulation. In this form there are four layers, laminations, pelts or bodies of fibers designated 160, 161, 162 and 163. The fibers of layers 160, 161 and 162 may be glass fibers, fusible rock, slag or ceramic fibers.

The inner layer 160 of fibers, which is in contact with a pipe, is impregnated with or contains an inorganic binder or a hybrid binder of organic-inorganic materials which is resistant to deterioration under high temperatures. The fibrous layers 161, 162 and 163 are impregnated with or contain organic or resinous binder. In the molding operation, the fibers are compressed and the binder in the fibrous layers set or cured forming a pipe wrap of a configuration similar to that shown in FIG. 6.

FIG. 13 illustrates a molded half section 168 of pipe wrap insulation. In this form the pipe wrap is composed of one or more layers or pelts 170 of glass fibers which are impregnated with or contain organic or resinous binder. The region 172 of the fibers adjacent the curved surface 174 of the insulation section, which is contiguous to a pipe, is further or partially impregnated with an inorganic binder or a hybrid binder. In this arrangement the fibers adjacent a pipe with which the insulation may be used are enriched with inorganic or hybrid binder whereby the region 172 is resistant to high temperatures of fluids that may flow through the pipe.

It is found preferable to compress the fibers in the mold and cure or set the organic or resinous binder in the layers 170 of fibers and thereafter partially impregnate the region 172 with an inorganic binder or a hybrid binder of organic and inorganic materials to a desired depth of about one quarter of an inch or less.

The inorganic or hybrid binder on the inner region 172 of the pipe wrap insulation may then be set or cured. While it is preferable in this form of the invention to utilize glass fibers, it is to be understood that the fibers 170 may be of one or more molded assemblies of fusible rock fibers, slag fibers or ceramic fibers.

FIG. 14 illustrates a molded half section 178 of pipe wrap insulation fashioned according to the invention. In this form there is illustrated a pipe wrap insulation comprising three layers, laminations, pelts or bodies 180, 181 and 182 of fibers. The fibers of layers 180 and 181 are preferably formed of fusible rock fibers, slag fibers or ceramic fibers impregnated with or containing binder of organic or resinous materials.

The outer layer 182 is preferably formed of glass fibers impregnated with or bearing organic or resinous binder. In processing the fibers to form the pipe wrap insulation 178, it is found preferable to compress the layers of fibers in the mold and cure or set the binder in all three layers 180, 181 and 182 of fibers.

The inner region 184 of the inner layer 180 may then be impregnated with an inorganic binder or a hybrid binder to a desired depth depending upon the size of the pipe wrap insulation. The inorganic binder or hybrid binder on the inner region 184 of the inner layer 180 of fibers may then be set or cured, thus providing a pipe insulation having a region of engagement with a pipe which is resistant to high temperatures.

In the preparation of the hybrid binder or organic-inorganic binder composition, the organic and inorganic constituents or materials and additives are mixed in a mixing facility as, for example, a conventional Cowles bladed mixer or other suitable mixing facility to thoroughly blend the constituents or materials and additives in the batch.

While the method illustrated in FIG. 1 involves spraying the hybrid binder directly onto the fibers in the forming chamber 60, it is to be understood that the hybrid binder may be sprayed onto a mass or mat of collected fibers and suction applied to effect efficient distribution of the hybrid binder in the fibrous mass or mat, the suction conveying away the excess binder.

The compositions of hybrid binder containing organic and inorganic constituents or materials may also contain additives to improve flow characteristics of the binder composition and to enhance high bond strength and thermal stability of the products. A requirement for a major constituent or material in the inorganic phase of the hybrid binder system is that it must have the characteristic of bonding to itself and to the fibers and to retain high bond strength at temperatures of 1000° F. or more. It must also be compatible with the organic constituents or materials in the binder system.

It is important that the inorganic binder or hybrid binder on the fibers be capable of being held in the layers of fibers in an uncured state for periods of time without deterioration of the binder until the binder-impregnated fibers are further processed or molded to desired configurations.

The ratio of the amount of fibers to the hybrid binder by weight in the product may vary within a comparatively wide range. For example, the amount of glass by weight in the product may be from about 20% to 80% by weight of fibers to 80% to 20% by weight of hybrid binder, the proportions being dependent in a large measure upon the characteristics of strength, thermal stability and insulating value desired in the block insulation or pipe wrap insulation or other fibrous products.

The proportion of organic and inorganic constituents of the hybrid binder may be in the following range: Organic constituents in the hybrid binder may be in a range of 10% and 90% by weight, and the inorganic constituents in a range of 90% to 10% by weight.

The use of organic binder in the outer layer of fibers of the product improves the appearance of the product. The organic binder when subjected to high heat tends to burn off or volatilize producing a pungent and obnoxious odor. It is therefore desirable to maintain the organic binder content in a sufficient amount as not to impair the bonding characteristics of the hybrid binder but low enough to minimize the pungent and obnoxious odor of the volatiles resulting from heat deterioration of the organic phase of the hybrid binder.

The binder may contain a humectant such as ethylene glycol to assist in retaining moisture in a layer or pelt of binder-bearing fibers until the fibers are molded into a final product or other processing operation performed. A small amount of a silicone coupling agent may be added to the binder. In certain instances, depending upon the characteristics desired in the end product, a hydrophobic agent may be added such as sodium methyl silanolate.

A small amount of thickening agent may be added such as ethyl cellulose or other cellulosics. Also a small amount of a molding release agent such as petroleum oil or fluorinated hydrocarbon may be added to the binder.

A punking inhibitor may also be added in the hybrid binder composition such as a borated urea formaldehyde resin marketed under the name Tybon 5611B by Pacific Resins Co.

Small amounts of fillers may be added to the binder. Filler materials, such as silicates, oxides, hydrates, carbonates, fly ash, or the like may be used to reduce the cost. The amount of filler that may be added is dependent upon the characteristics desired in the fibrous end product impregnated with or containing the hybrid organic-inorganic binder composition.

An important function of the inorganic phase of the binder is the enveloping of the fibers with a film of the inorganic binder to elevate the thermal softening point of the fibers to prevent fiber slump and maintain high bonding strength in the fiber-binder composite or product in event of thermal decomposition of the organic binder in the system.

Certain additives may be included in the hybrid binder to perform particular functions. For example, materials such as bone glue, starch or dextrine may be added to improve the film forming characteristics of the binder. Bone glue quickly gels with the resin or organic constituent at elevated temperatures thereby preventing or reducing the migration of binder in the fibers.

The method and arrangement illustrated in FIG. 1 may be utilized to form a mass or layers of fibers wherein the fibers forming a surface layer may be impregnated with resin or organic binder and the remaining fibers or layers of fibers impregnated with an inorganic binder or a hybrid or organic-inorganic binder. For example, in FIG. 1 the fibers 54 of the first column of fibers formed from the fiber-forming unit at the left may be sprayed only with organic or resin binder delivered from the sprays 58 onto the fibers.

The fibers from the left-hand fiber-forming unit deposited on the conveyor flight 66 may form the outer or surface layer for an end product. The fibers formed from the intermediate and right-hand fiber-forming units may be impregnated with an inorganic binder or a hybrid or organic-inorganic binder composition. With this method, the fibers may be molded and compressed and the binder cured to form block insulation or the assemblage may be molded into pipe wrap. It is to be understood that the amount of fibers or the number of layers of fibers in an assemblage may be varied depending upon the extent of compression of the fibers to obtain a desired density and thickness of the end product.

It is apparent that, within the scope of the invention, modifications and different arrangements may be made other than as herein disclosed, and the present disclosure is illustrative merely, the invention comprehending all variations thereof.

I claim:

1. A fibrous product comprising a body formed of layers of compressed fibers of inorganic fiber-forming material, an organic binder in the layers of fibers of the body, and an additional hybrid binder comprising an organic binder and an inorganic binder on the fibers of one of the layers of fibers of the product.

2. A fibrous product according to claim 1 wherein the density of the fibrous product is in a range of eight pounds per cubic foot and twenty-five pounds per cubic foot.

3. A fibrous product comprising a body formed of layers of compressed fibers of inorganic fiber-forming material, an organic binder in at least one layer of the fibers in the body, and a hybrid binder comprising an organic binder and an inorganic binder in at least one other layer of fibers of the fibrous body.

4. A fibrous product comprising a body of compressed fibers of inorganic fiber-forming material, the body comprising a plurality of layers of the fibers, an inorganic binder in at least one layer of the fibers, and a hybrid binder comprising an organic binder and an inorganic binder in the fibers of at least one other layer of the fibrous body.

5. A fibrous product comprising a body of compressed fibers of inorganic fiber-forming material, the body comprising a plurality of layers of the fibers, a hybrid binder comprising an organic bonding material and an inorganic bonding material on said fibers, a layer of glass fibers on a surface of the body of fibers, and an organic binder in the layer of glass fibers, said binders when set bonding the layer of glass fibers to the body of fibers.

6. A fibrous product according to claim 5 wherein the fibers of the body are selected from the group of amorphous glass fibers, crystallizable glass fibers, fusible rock fibers, fusible slag fibers and ceramic fibers.

7. A fibrous product comprising a plurality of layers of compressed fibers of fiber-forming inorganic material, certain of said layers of fibers containing a hybrid binder of organic and inorganic bonding materials, and at least one layer of the fibers containing an organic binder.

8. A fibrous product comprising a plurality of layers of compressed fibers of fiber-forming inorganic material, certain of the layers of fibers containing an organic binder, at least one other layer of the fibers containing a hybrid binder comprising organic and inorganic bonding materials.

9. A fibrous product comprising a body of layers of compressed fibers wherein the fibers are selected from the group of crystallizable glass fibers, fusible rock fibers, fusible slag fibers and ceramic fibers, certain of said layers of fibers containing a hybrid binder comprising organic and inorganic bonding materials, the fibrous body including at least one layer of amorphous glass fibers, and an organic bonding material in the layer of amorphous glass fibers.

10. A fibrous product comprising a body of layers of fibers, certain of said layers being fibers selected from the group of crystallizable glass fibers, fusible rock fibers, fusible slag fibers and ceramic fibers, a surfacing layer of fibers for the product being of amorphous glass fibers and containing organic bonding material, the fibers of the layers formed of fibers selected from the group of crystallizable glass fibers, fusible rock fibers, fusible slag fibers and ceramic fibers containing organic bonding material, and a layer of the fibers of the product selected from the group of crystallizable glass fibers, fusible rock fibers, fusible slag fibers and ceramic fibers additionally having thereon hybrid binder comprising organic and inorganic bonding materials.

11. A block insulation product comprising layers of fibers of inorganic material, certain of said layers of fibers being impregnated with hybrid binder comprising organic and inorganic bonding materials, and a surfacing layer of the fibers impregnated with an organic binder.

12. A block insulation product comprising layers of glass fibers, certain of said layers of fibers being impregnated with hybrid binder comprising organic and inorganic bonding materials, and a surfacing layer of the fibers impregnated with an organic binder.

13. A fibrous product comprising a body of layers of fibers of inorganic fiber-forming material, an organic binder in a layer of the fibers of the body, and an inorganic binder in another layer of fibers of the body.

14. A fibrous product comprising a body of layers of fibers of inorganic fiber-forming material, an organic binder in a surface layer of the fibers in the body, and an inorganic binder in the fibers of another layer of the fibrous body.

15. A fibrous product comprising a body of layers of fibers of inorganic fiber-forming material, an organic binder in one layer of the fibers in the body, and an inorganic binder in the fibers of another layer of the fibrous body.

16. A block insulation product comprising a body of layers of fibers of inorganic material, the layer of fibers of one outer region of the body being impregnated with an inorganic binder, and the layer of fibers of another outer region of the body being impregnated with an organic binder.

17. A block insulation product comprising a body of layers of fibers of inorganic material, certain of said layers of fibers being impregnated with an inorganic binder, and a surfacing layer of the fibers impregnated with an organic binder.

18. A block insulation product comprising layers of glass fibers, certain of said layers of fibers being impregnated with an inorganic binder, and a surfacing layer of the fibers impregnated with an organic binder.

* * * * *